US011126794B2

(12) United States Patent
Li et al.

(10) Patent No.: US 11,126,794 B2
(45) Date of Patent: Sep. 21, 2021

(54) TARGETED REWRITES

(71) Applicant: Microsoft Technology Licensing, LLC, Redmond, WA (US)

(72) Inventors: Zhang Li, Bellevue, WA (US); Christopher John Brockett, Bellevue, WA (US); William Brennan Dolan, Kirkland, WA (US); Christopher Brian Quirk, Seattle, WA (US); Alice Yingming Lai, Seattle, WA (US); Susan Michele Hendrich, Redmond, WA (US); Olivier Gauthier, Duvall, WA (US); Kaushik Ramaiah Narayanan, Bellevue, WA (US); Maria Isabel Carpenter, Snohomish, WA (US); Juhi Amitkumar Naik, Bellevue, WA (US); Michael Wilson Daniels, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 10 days.

(21) Appl. No.: 16/381,965

(22) Filed: Apr. 11, 2019

(65) Prior Publication Data
US 2020/0327189 A1 Oct. 15, 2020

(51) Int. Cl.
*G06F 40/20* (2020.01)
*G06F 40/253* (2020.01)
(Continued)

(52) U.S. Cl.
CPC .......... *G06F 40/253* (2020.01); *G06F 40/166* (2020.01); *G06F 40/30* (2020.01); *G06F 3/0482* (2013.01)

(58) Field of Classification Search
CPC ........ G06F 40/20; G06F 40/30; G06F 40/166; G06F 40/253; G06F 40/284;
(Continued)

(56) References Cited

U.S. PATENT DOCUMENTS 7,461,351 B2 * 12/2008 Bailey .................. G06F 40/103
715/781
8,121,842 B2 * 2/2012 Shih ........................ G10L 13/02
704/260

(Continued)

OTHER PUBLICATIONS

"10 little-known Microsoft Word tools that can help you write better content", Retrieved From: https://soapboxly.com/content/write-better-content-microsoft-word-tools/, Mar. 5, 2019, 19 Pages.
(Continued)

*Primary Examiner* — Maikhanh Nguyen
(74) *Attorney, Agent, or Firm* — Talem IP Law, LLP

(57) ABSTRACT

A method for providing targeted rewrites can include receiving a selection of text in a file; generating a set of target rewrites of the selection of text, the set of target rewrites comprising: at least one phrase or sentence having semantic similarity to a phrase or sentence of the selection of text; and a style that corresponds to a particular target style, wherein a target style is a representative style for a genre, profession, or environment; and providing for selection one or more of the target rewrites of the set of target rewrites.

16 Claims, 13 Drawing Sheets

(51) Int. Cl.
*G06F 40/166* (2020.01)
*G06F 40/30* (2020.01)
*G06F 3/0482* (2013.01)

(58) Field of Classification Search
CPC .............. G06F 40/289; G06F 3/04842; G06F 16/3344; G06N 20/00; G06N 3/08
See application file for complete search history.

(56) References Cited

U.S. PATENT DOCUMENTS

| | | | | |
|---|---|---|---|---|
| 8,930,189 | B2* | 1/2015 | Cath | G10L 15/30 704/235 |
| 9,141,689 | B2* | 9/2015 | Chen | G06F 40/279 |
| 10,319,363 | B2* | 6/2019 | Qian | G10L 13/033 |
| 2003/0011642 | A1* | 1/2003 | Sheng | G06F 40/274 715/810 |
| 2005/0060138 | A1* | 3/2005 | Wang | G06F 3/018 704/1 |
| 2005/0188307 | A1* | 8/2005 | Bailey | G06F 40/103 715/205 |
| 2006/0053001 | A1* | 3/2006 | Brockett | G06F 40/58 704/9 |
| 2007/0053593 | A1* | 3/2007 | Williamson | G10L 15/22 382/229 |
| 2007/0073532 | A1* | 3/2007 | Brockett | G06F 40/253 704/9 |
| 2008/0279535 | A1* | 11/2008 | Haque | H04N 21/2355 386/244 |
| 2009/0070109 | A1* | 3/2009 | Didcock | G10L 15/30 704/235 |
| 2009/0313274 | A1 | 12/2009 | Chen et al. | |
| 2010/0153114 | A1* | 6/2010 | Shih | G06F 40/106 704/260 |
| 2011/0087961 | A1* | 4/2011 | Fitusi | G06F 40/274 715/261 |
| 2013/0110509 | A1* | 5/2013 | Cath | G10L 15/30 704/235 |
| 2014/0032206 | A1* | 1/2014 | Grieves | G06F 40/274 704/9 |
| 2015/0154174 | A1* | 6/2015 | Hoover | G06F 40/253 704/9 |
| 2019/0147034 | A1* | 5/2019 | Maneriker | G06F 40/289 704/9 |

OTHER PUBLICATIONS

"Improve Written Language Using REF-N-WRITE", Retrieved From: https://www.youtube.com/watch?v=m6hlXzqO3r4, Mar. 16, 2017, 6 Pages.

"Rewrite in Word—Say it another way!", Retrieved From: https://web.archive.org/web/20200602234741/https://blog-insider.office.com/2019/08/12/rewrite-in-word-say-it-another-way/, Aug. 12, 2019, 4 Pages.

"International Search Report and Written Opinion Issued in PCT Application No. PCT/US2020/024120", dated Jul. 10, 2020, 13 Pages.

Shrimai Prabhumoye et al., "Style Transfer Through Back-Translation", In repository of arXiv, arXiv:1804.09000, Apr. 24, 2018, 12 Pages.

"Import, Search and Navigate Documents Using REF-N-Write", Retrieved From: https://www.youtube.com/watch?v=Qf7qyyKtbyQ, Mar. 16, 2017, 1 Page.

* cited by examiner

FIG. 6A

The Amazon Rainforest is an expansive forest located in the Amazon Basin. Contained within it is a dizzying array of distinct tree species – approximately 16,000 different species in total. Because of this, its dense animal biodiversity, its higher taxonomic uniqueness, and the rarity of the habitat, the Amazon is also considered to by a distinct ecoregion. (Amazon Rainforest, Amazon Plants, Amazon River Animals)

The Amazon Rainforest is ... in the Amazon Basin. Contained within it [Set Proofing Language ...] tree species – approximately 16,000 diff →Rewrite se of this, its dense animal biodiversity, its higher taxonomic uniqueness, and the rarity of the habitat, the Amazon is also considered to by a distinct ecoregion. (Amazon Rainforest, Amazon Plants, Amazon River Animals)

Editor | X
Rewrite phrase sentence ← 632
Explore different ways of writing this phrase
Target A:
the Amazon's dense biological diversity
the Amazon's dense animal biodiversity
Target B:
its high variety of animal life within the region ← 640

The Amazon Rainforest is an expansive forest located in the Amazon Basin. Contained within it is a dizzying array of distinct tree species – approximately 16,000 different species in total. Because of this, its dense animal biodiversity, its higher taxonomic uniqueness, and the rarity of the habitat, the Amazon is also considered to by a distinct ecoregion. (Amazon Rainforest, Amazon Plants, Amazon River Animals)

Editor | X
◯ Undo phrase rewrite

The Amazon Rainforest is an expansive forest located in the Amazon Basin. Contained within it is a dizzying array of distinct tree species – approximately 16,000 different species in total. Because of this, its high variety of animal life within the region, its higher taxonomic uniqueness, and the rarity of the habitat, the Amazon is also considered to by a distinct ecoregion. (Amazon Rainforest, Amazon Plants, Amazon River Animals)

645

Digital Marketing 101
Key tools for Engagement Marketing

INTRODUCTION

Digital marketing is really fundamental to businesses' success in today's modern era of engagement marketing. Promoting brands, products, and services online and through mobile applications is, at this point in time, quickly becoming table stakes. So as a marketer, you have to get on board.

But online advertising expertise is just the tip of the iceberg. Marketers have to dig deep into today's vast and intricate cross-channel world to discover the most inclusive and impactful strategies required to build a thriving business.

Search engine optimization pay per click advertising, and conversion rate optimization techniques work in tandem to demystify consumer behaviors, capture customers attention, and turn people into loyal buyers over time. No digital marketing campaing should be without these critical activities.

○ Rewrite this sentence

[See Suggestions]  No, Thanks

FIG. 8B

Digital Marketing 101
Key tools for Engagement Marketing

INTRODUCTION

Rewrite

Digital marketing is really fundamental to businesses' success in today's modern era of engagement marketing. Promoting brands and services online through mobile applications is quickly becoming table stakes. So as a marketer, you have to get on board.

Other suggestions →

Use this

But online advertising expertise is just the tip of the iceberrg. Marketers have to dig deep into today's vast and intricate cross-channel world to discover the most inclusive and impactful strategies required to build a thriving business.

FIG. 8C

TARGETED REWRITES

BACKGROUND

Reviewing and writing tools generally include spelling and grammar checks. These tools may be part of or work with software applications where a user creates or consumes content. When applied, a reviewing or writing tool may detect errors in spelling, punctuation, and grammar, and flag those errors for correction. In some cases, a reviewing or writing tool may identify or recognize writing style, contextual spelling, and even sentence structure. Some reviewing and writing tools can identify readability and provide suggestions to help users improve their writing.

BRIEF SUMMARY

Reviewing and writing tools providing targeted rewrites are described. A "rewrite" refers to a suggested phrase, clause, or sentence to replace an existing one. A "targeted rewrite" refers to a rewrite that is based on a particular style, which may be a style expected in a particular environment or for a particular audience.

A method for providing targeted rewrites can include receiving a selection of text in a file; generating a set of target rewrites of the selection of text, the set of target rewrites comprising: at least one phrase or sentence having semantic similarity to a phrase or sentence of the selection of text; and a style that corresponds to a particular target style, wherein a target style is a representative style for a genre, profession, or environment; and providing one or more of the target rewrites of the set of target rewrites. In some cases, a selection of one of the target rewrites may be received; and the selection of text in the file can be replaced with the selected target rewrite. In some cases, one of the one or more of the target rewrites automatically replaces or modifies the selection of text in the file without express selection and can instead be accepted actively or passively. In some cases, the replacement can be across modalities such that the target rewrite can be in or be converted to a different file format than the original text.

In some cases, the set of target rewrites can be generated via a targeted rewrite engine that leverages one or more target-specific models to identify likely rewrites for the phrase or sentence. The targeted rewrite engine can include a neural network.

In some cases, target information can be received along with the selection of text in the file. The target information can be used to identify the particular model or models used in generating the set of target rewrites.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4A shows a process flow for generating models and FIG. 4B shows a process flow for operation.

FIG. 5A illustrates operation during a training phase and FIG. 5B illustrates operation during an embedding phase.

FIGS. 6A-6D illustrate an example scenario for an application with a targeted rewrite tool.

FIGS. 8A-8C illustrate example scenarios of a targeted rewrite of a sentence.

DETAILED DESCRIPTION

Reviewing and writing tools providing targeted rewrites are described. A "rewrite" refers to a suggested phrase, clause, or sentence to replace an existing one and is expected to have semantic similarity to the text the rewrite is replacing. A "targeted rewrite" refers to a rewrite that is based on a particular style corresponding to a particular target, which may be a style expected in a particular environment or for a particular audience. This style can be referred to as a "target style." That is, a "target style" is a representative style for a genre, profession, or environment.

Figure 1A:
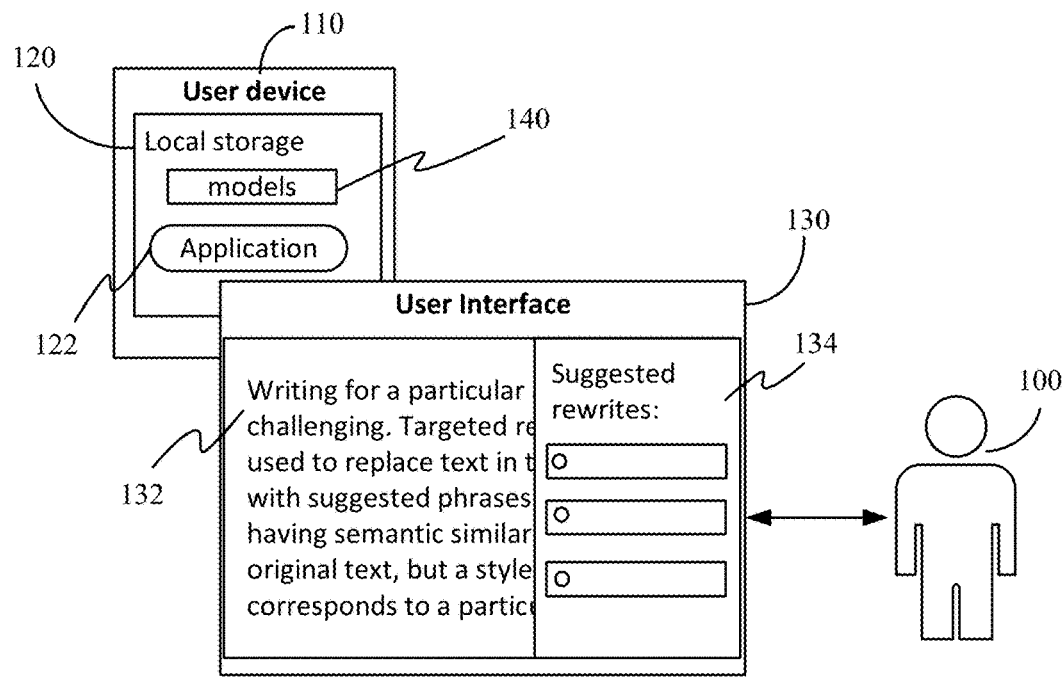
FIGS. 1A and 1B illustrate example operating environments for targeted rewrites.
Figure 1B:
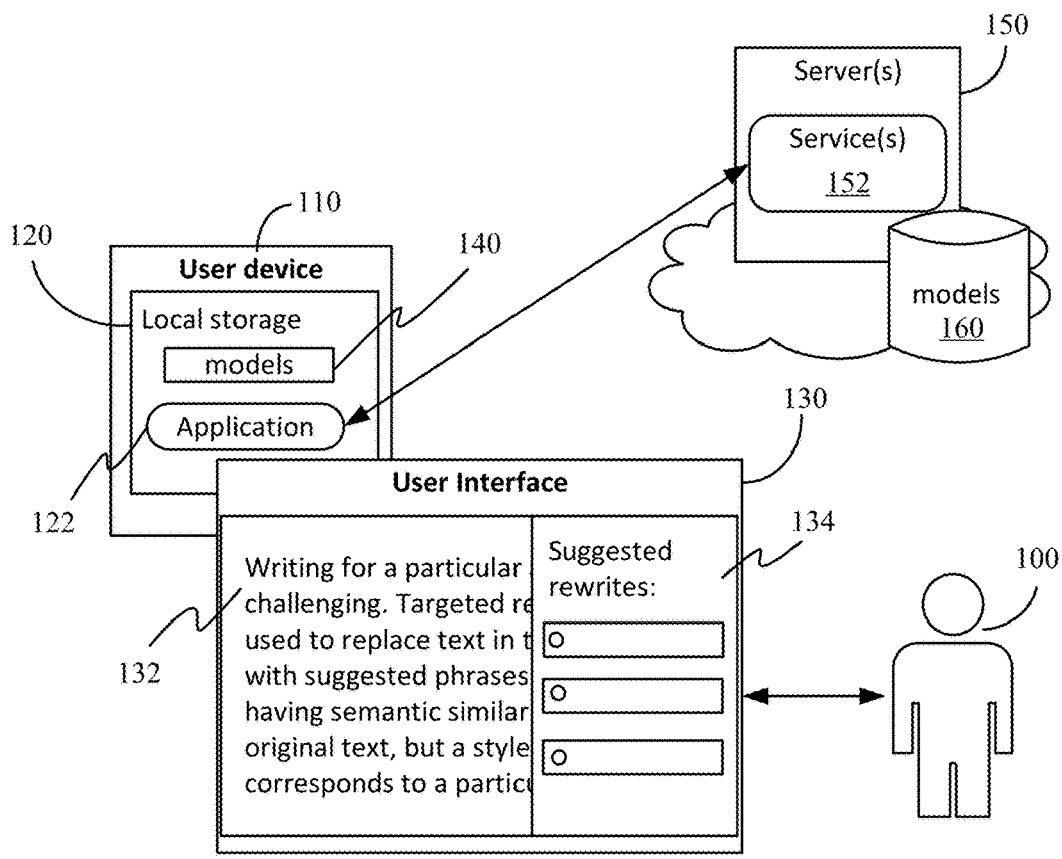

FIGS. 1A and 1B illustrate example operating environments for targeted rewrites. FIG. 1A illustrates an offline implementation; and FIG. 1B illustrates an online implementation. Referring to both FIGS. 1A and 1B, a user 100 may be interacting with a computing device 110 when creating content that may be suitable for a targeted rewrite. The computing device 110 includes, among other components, a local storage 120 on which an application 122 may be stored. The application 122 may be an application with a targeted rewrite tool or may be a web browser or front-end application that accesses the application with targeted rewrite tool over the Internet or other network. In some cases, application 122 includes a graphical user interface 130 that can provide a canvas 132 in which content may be created or consumed and a pane or window 134 (or contextual menu or other suitable interface) providing suggested rewrites. Application 122 may be, but is not limited to, a word processing application, email or other message application, whiteboard or notebook application, or a team collaboration application (e.g., MICROSOFT TEAMS, SLACK).

In the offline scenario shown in FIG. 1A, user 100 may directly or indirectly (e.g., by being in targeted rewrite mode or by issuing an audio command to perform a targeted rewrite) select text in a file displayed in the user interface 130. The targeted rewrite tool (e.g., as part of application 122) can use a set of models 140 stored in the local storage 120 to generate a set of target rewrites. The models 140 may be provided as part of the targeted rewrite tool and, depending on the robustness of the computing device 110 may be a 'lighter' version (e.g., may have fewer feature sets) than models available at a server.

In the online scenario shown in FIG. 1B, user 100 may directly or indirectly select text in a file displayed in the user interface 130. The targeted rewrite tool (e.g., as part of application 122) can communicate with a server 150 providing targeted rewrite services 152 that use one or more models 160 to generate a set of target rewrites.

In some cases, the entire file can be analyzed by the targeted rewrite tool to identify the selection(s) of text being the subject of a targeted rewrite. In some of such cases, a window of text can be used to identify selections of text that are each applied to the targeted rewrite process.

In some cases, the target rewrite replacement of content can be across modalities such that a target rewrite can be in or be converted to a different file format than the original text.

For example, spontaneous speech or formal dictation can be transcribed and subject to targeted rewrite. In some cases, the transcribed file can be opened in an application with a targeted rewrite tool (or the transcription application can include a target rewrite tool) and the transcribed text can be rewritten using the targeted rewrite tool. The selection of text in the file may be accomplished, for example, by audio command (e.g., a user may say "here's my talk, write it up for me and clean it up when you do it") and the targeted rewrite tool can turn the spontaneous speech into formal written text.

As another example of target rewrite replacement across modalities, an academic article may be converted to a spoken lecture suitable for a public audience on the web. As an illustrative example, a user may upload or open a paper in an application and have presentation slide format text be the target such that the application with targeted rewrite tool converts the academic article into text suitable for slides. In some cases, notes portions may be created along with the slides. The target may instead, or in addition, be to convert the academic paper into a five minute talk. Depending on the training for the models, it may be possible to have the resulting text (of the five minute talk) have markers to correspond to the slides.

Figure 2:
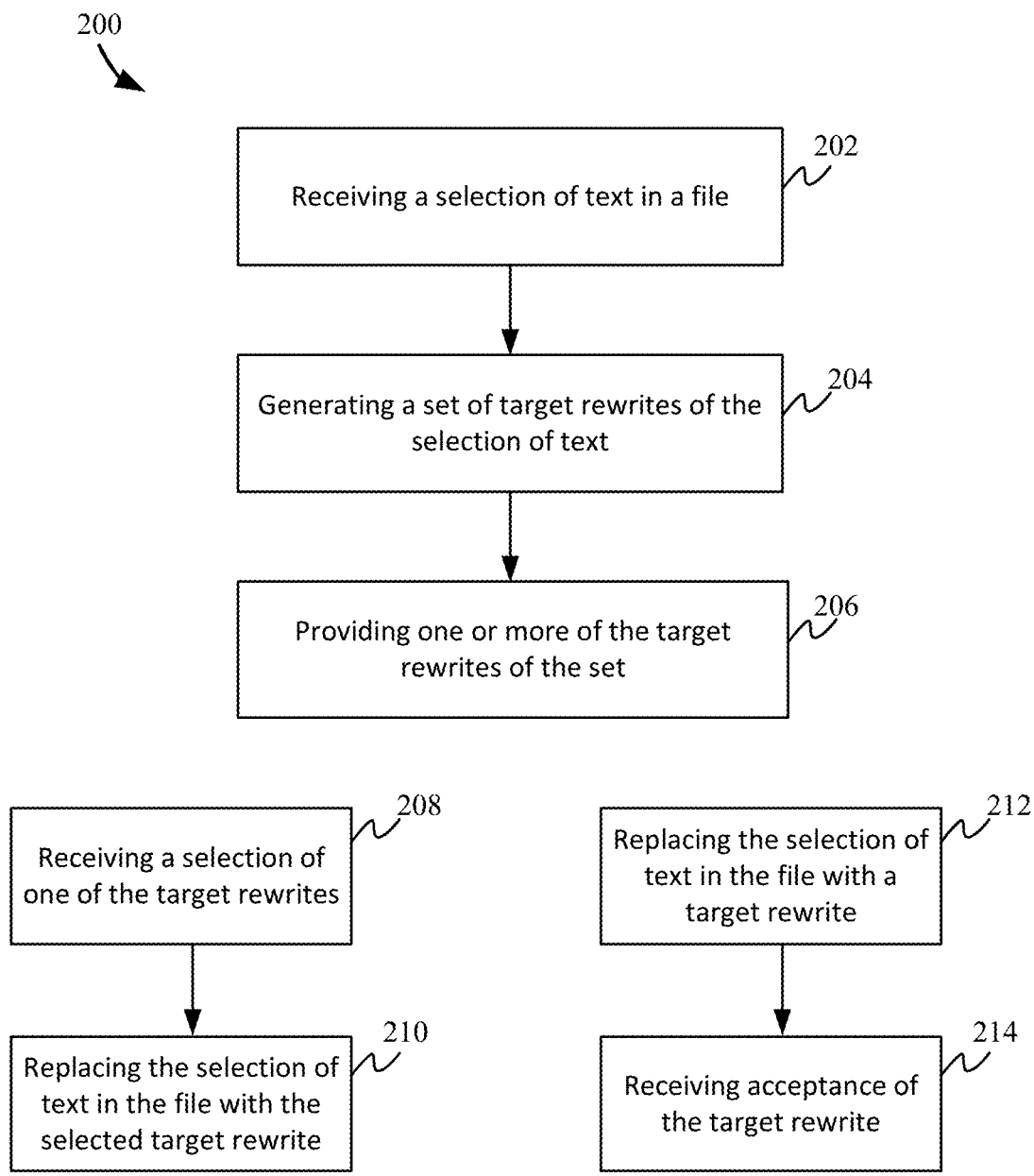
FIG. 2 illustrates a method for providing targeted rewrites.

FIG. 2 illustrates a method for providing targeted rewrites. Some or all of method 200 may be executed at, for example, server 150 as part of services 152 (e.g., server 150 may include instructions to perform method 200). In some cases, method 200 may be executed entirely at computing device 110, for example, as an offline version (e.g., computing device 110 may include instructions to perform method 200). In some cases, method 200 may be executed at computing device 110 while in communication with server 150 to support the generation of target rewrites (as discussed in more detail with respect to FIG. 3).

Referring to FIG. 2, method 200 can include receiving (202) a selection of text in a file and generating (204) a set of target rewrites of the selection of text. The selection of text may be a portion of text expressly selected by a user, may include a certain number of characters before and/or after text expressly selected by a user, or be a section of or entire portion of text in the file (where the selection of text may be one or more selections of identified phrases, sentences, or other unit of text being rewritten). The file may be any suitable file format for a corresponding application that has the targeted rewrite tool. As some examples, the file may be a document (e.g., with a .docx file format), a message item (e.g., from an email or text message or instant message), or a chat channel item (e.g., in a format used by a team collaboration application).

The set of target rewrites can include at least one phrase or sentence having semantic similarity to a phrase or sentence of the selection of text and a style that corresponds to a particular target style. Once the set of target rewrites are generated, the method further includes providing (206) one or more of the target rewrites of the set of target rewrites. In some cases, the set of target rewrites may be displayed to the user via the pane or window 130 as shown in FIGS. 1A and 1B.

The selection of text in the file can be replaced with a target rewrite of the one or more of the target rewrites. For example, in some cases, the method can include receiving (208) a selection of one of the target rewrites; and replacing (210) the selection of text in the file with the selected target rewrite. The resulting text may be displayed on canvas 132.

As another example, in some cases, the method can include replacing (212) the selection of text in the file with a target rewrite and receiving (214) an explicit or implicit acceptance of the target rewrite. The target rewrite replacing the text can be displayed on the canvas 132 with a visual indication that an automatic text replacement has occurred. For example, the replacement may be a manner such as visually indicated by track-changes, a highlight, an underline, or other visual indication. The automatic text replacement can be accepted or rejected via any suitable method including, but not limited to, selection of a menu command, verbal command, or implicit acceptance by not changing the replacement during the session or after some other period of time or activity.

Figure 3:
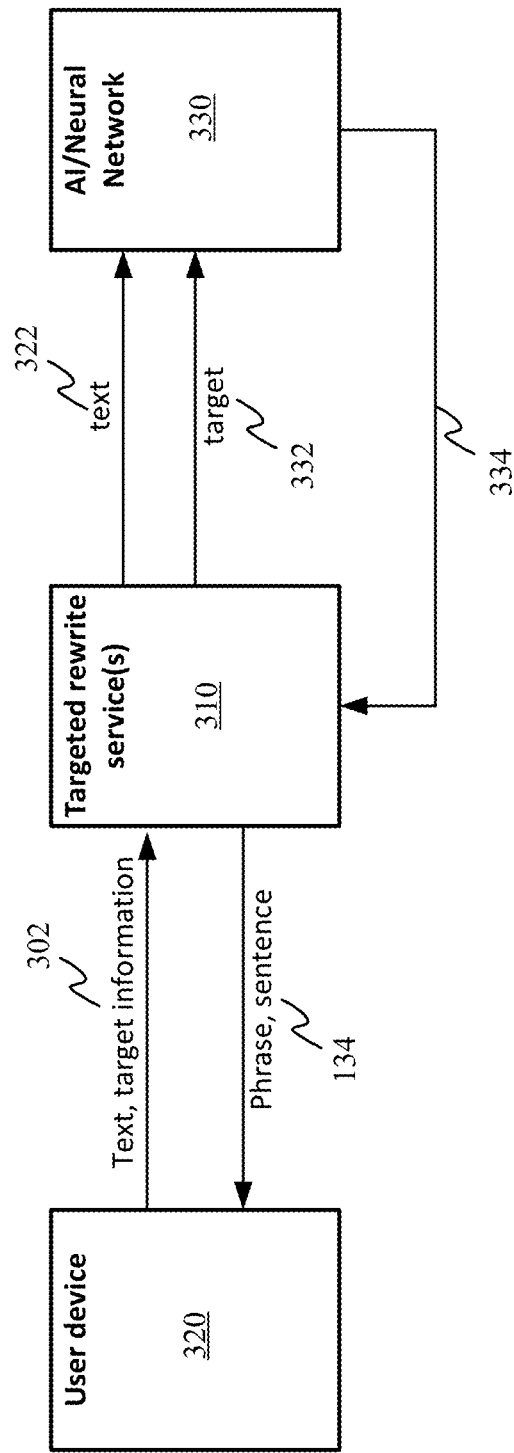
FIG. 3 illustrates an example implementation of targeted rewrites.

FIG. 3 illustrates an example implementation of targeted rewrites. Referring to FIG. 3, a selection of text in a file can be received at a targeted rewrite service 310 along with target information. The text and target information 302 can be captured via a computing device 320 such as described with respect to computing device 110 and user interface 130 of FIGS. 1A and 1B. Aspects of service(s) 310 may themselves be carried out on computing device 320 and/or may be performed at a server such as server 150 described with respect to FIG. 1B.

The selection of text provided to/received by service(s) 310 may include a certain number of characters before and/or after text expressly selected by a user, the selected text only, or an entire text (or specified block of text) of the file. In some cases, location information of where in the file the text was selected (or where a focus of interest may be from, for example, a cursor is positioned) may be included with the text and target information 302 to further facilitate the identification of the particular phrase or sentence to be rewritten. Any identified phrases or sentences (or other suitable unit of text) 322 may be communicated to a targeted rewrite engine 330, which may be a neural network or other machine learning or artificial intelligence engine, for generating a targeted rewrite.

The services 310 can determine a target of the rewrite from the target information and provide an indicator of the target 332 to the targeted rewrite engine 330. The target indicates which model is used by the targeted rewrite engine 330 for generating a targeted rewrite. Results 334 of the analysis at the targeted rewrite engine 330 can be returned to the targeted rewrite service 310, which can provide the suggested phrases or sentences 336 to the computing device 320 for replacement of the original text.

In some cases, the target information is an explicit indicator of a target. For example, the targeted rewrite tool may provide target options for the user to select. Then, when a user selects a particular target from the target options, an indicator of that particular target (e.g., the name of the target) can be provided as the target information. The targeted rewrite services 310 can determine, from the indicator, which target is desired to be used; and communicate the target 332 to the targeted rewrite engine 330 such that the appropriate model or models are used.

In some cases, the target information does not include an explicit indicator of the target. For example, instead of selecting a particular target from target options, a user may have entered a natural language statement regarding the target. The targeted rewrite service(s) 310 may be able to determine, from the natural language statement, a likely one or more targets (using any suitable method for interpreting natural language, including but not limited to natural language processing services); and can provide the determined target(s) 332 to the targeted rewrite engine 330.

In some cases, the target information includes context information; and the context information can be used to identify one or more targets. For example, the context information may include, but is not limited to, an application name (e.g., the application for which the text is being created/consumed), a user name (which may be used to obtain user history or user-specific information that can be used to identify a target), a file name (e.g., the name of the file being created/consumed), other content in the file, or a combination thereof. As an illustrative example, when the target information includes an application name, the application name may be used by the system to identify the most likely targets, for example, by accessing a look-up table or other data structure providing a mapping of application to targets. As another illustrative example, when other content in the file is provided as the target information, the other content in the file may be used to determine most likely matches for target styles by any suitable classifier.

Figure 4A:
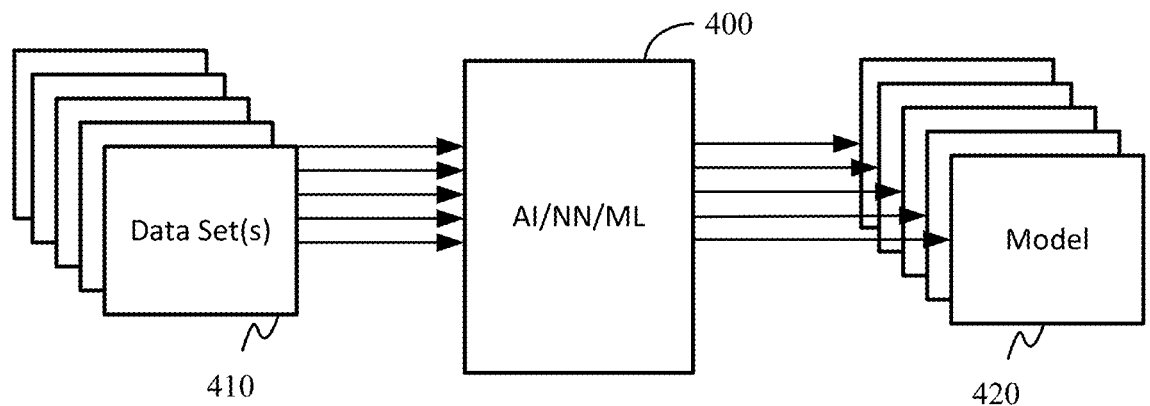
FIGS. 4A and 4B illustrate an example targeted rewrite engine, where
Figure 4B:
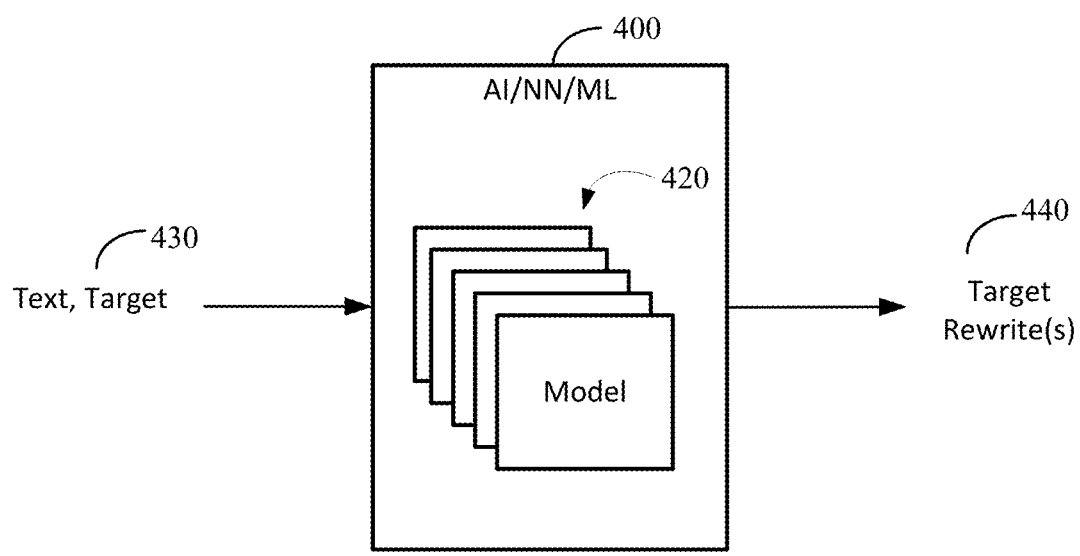

FIGS. 4A and 4B illustrate an example targeted rewrite engine, where FIG. 4A shows a process flow for generating models and FIG. 4B shows a process flow for operation. Turning first to FIG. 4A, a targeted rewrite engine 400 may be trained on various sets of data 410 to generate appropriate models 420. Then, referring to FIG. 4B, the models may be mapped to particular targets such that when text and a particular target (430) is provided to the targeted rewrite engine 400, the appropriate model(s) 420 can be selected to generate the target rewrites 440 for the text (such as also described with respect to FIG. 3).

Figure 5A:
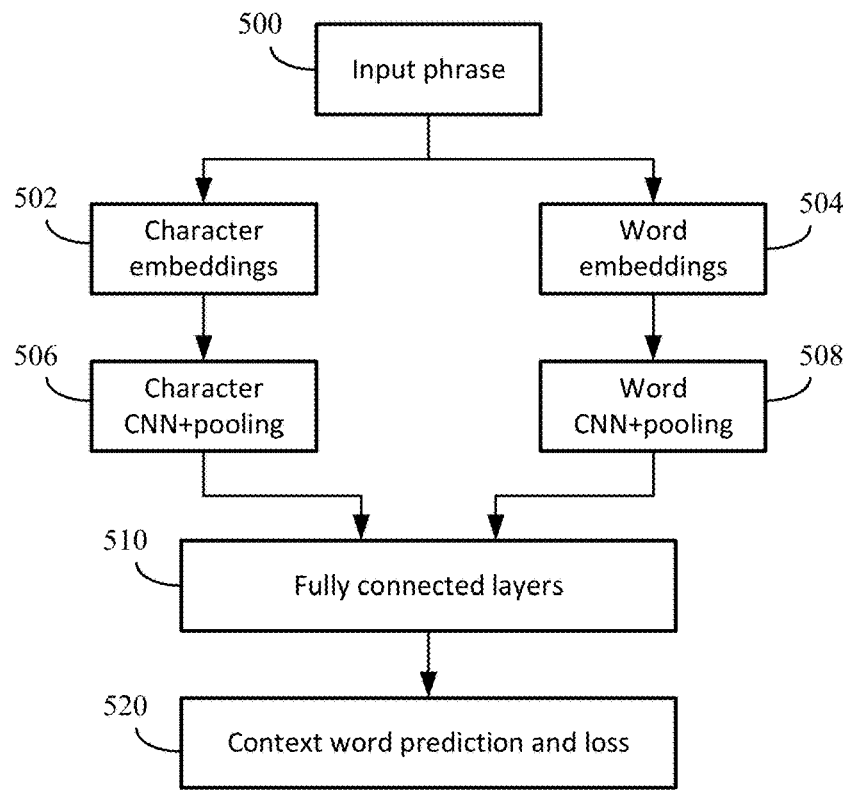
FIGS. 5A and 5B illustrate an example targeted rewrite classification system for a targeted rewrite engine.
Figure 5B:
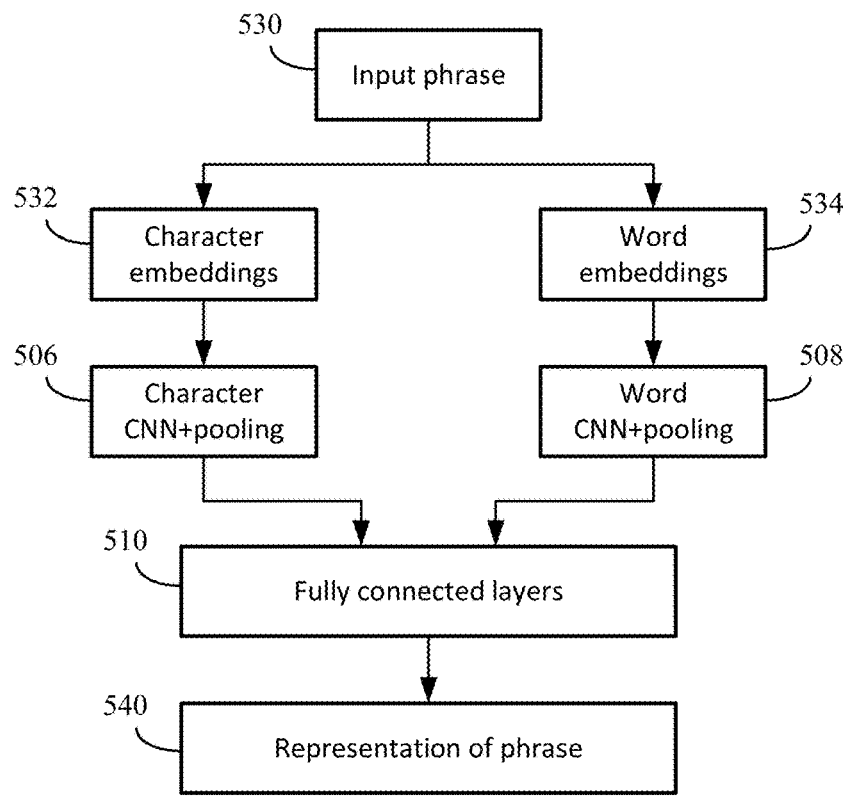

FIGS. 5A and 5B illustrate an example targeted rewrite classification system for a targeted rewrite engine. FIG. 5A illustrates operation during a training phase and FIG. 5B illustrates operation during an embedding phase.

In some cases, direct embeddings can be learned. For example, similar to a skip-gram model for training word embeddings, training can be performed on a large corpus of text. The content in the corpus can be configured to represent a particular target. For example, formal writing may be trained on a corpus of content used in formal environments. Scientific writing may be trained on a corpus of scientific journals. Targets may even be subject-specific, for example, trained on content containing certain topics or written by a particular person or people.

Since the training is unsupervised, there does not need to be any labeling. The training is created by using a sliding window over the text. The window size corresponds to the phrase length and can be varied. Given a phrase, the goal is to predict the context words (e.g., the words that come directly before and after the phrase).

Referring to FIG. 5A, input phrases 500 (of the specified window size) from the training corpus can be received at the targeted rewrite classification system. Each phrase 500 is split into its characters (symbols, letters, trigrams, bigrams etc. for the character embeddings 502) and its words (for the word embeddings 504). The character embeddings 502 are analyzed through character convolutional neural network (CNN) layers and pooling layers ("character CNN+pooling" layers 506) and the word embeddings 504 are analyzed through word CNN layers and pooling layers ("word CNN+pooling" layers 508). The character and word embeddings are then recombined through fully connected layers 510 to output context word prediction and loss 520. This output builds the models used during targeted rewrite.

Referring to FIG. 5B, during a targeted rewrite, an input phrase 530 is split into its characters and its words for identifying character embeddings 532 and word embeddings 534. The character embeddings 532 are analyzed through the character CNN+pooling layers 506 and the word embeddings 534 are analyzed through the word CNN+pooling layers 508; and the two paths are recombined in the fully connected layers 510. Because of the character embeddings, spell checking and morphological variation can be addressed. The result of the recombination provides the representation of phrase 540 for the targeted rewrite of the input phrase 530.

Phrasal representations often use some form of an aggregate of the word embeddings for the constituent words. This works well in a lot of cases, but has certain problems when the phrase itself has a meaning totally different from the words in it. By using the described targeted rewrite classification system, a representation of the phrase itself can be found (and spell checking and morphological variation can be addressed). These representations can then be used in downstream tasks such as measuring semantic similarity between pairs of phrases. In some cases, sum of word embeddings may be used, where the sum or average of the constituent word embeddings are used to embed phrases. In some cases, a weighted averaging of word embeddings may be used. For example, instead of taking the simple average of the constituent word embeddings in the phrase, each word embedding is weighted before combining. These weights can be learned using an annotated set of phrase pairs with their similarity scores.

Here, the figures illustrate an architecture using a convolutional neural network (CNN); however, other neural network architectures may be used instead or in addition. For example, the CNN layers can be replaced with other modules such as recurrent networks or transformers.

FIGS. 6A-6D illustrate an example scenario for an application with a targeted rewrite tool.

Referring to FIG. 6A, a user may be working within an application that has a targeted rewrite tool. For example, the user may be writing or editing content 600 in a document. The user may access the targeted rewrite tool through a direct request. In the illustrated example, a right click (610) in the document can cause a context menu 615 to surface such as shown in FIG. 6B. Referring to FIG. 6B, the context menu 615 may include reviewing tools and provide an icon or menu selection for the rewrite command 620. Selecting (625) the rewrite command 620 can cause an editor pane 630 to open, such as shown in FIG. 6C. Referring to FIG. 6C, the editor pane 630 can show options for rewrite. The options can be given for a particular trigger (e.g., text, target, unit such as phrase, sentence, etc.). For example, the user may have indicated the right click within the word "animal" and selected the rewrite to show phrases (e.g., reflected by the tab option 632 of "phrase"; other option could be "sentence" see also FIGS. 8A-8C.

The indication of a phrase rewrite would enable a phrase to be identified from the word(s) around the point selection (or any word or words around any that may be selected before the right click). In this example, the right click within the word "animal" is determined by the system to be a selection of the phrase "its dense animal biodiversity" 635.

Accordingly, in response to receiving user input of a selection of at least a phrase of text in a file (e.g., in response to selection 625 of rewrite command 620), the system can generate a set of target rewrites of the phrase of text and provide suggested rewrites for selection by the user. As previously described, the particular set of target rewrites have semantic similarity to the phrase of text; and a style that corresponds to a particular target style, when the target style is a representative style for a genre, profession, or environment. In the illustrated example, no explicit target selection is shown. However, target information may have been provided to the services using contextual information or the target information may not have been sent because the system defaults to certain targets. Here, two targets are shown provided with associated suggestions. Target A includes suggestion "the Amazon's dense biological diversity" and the suggestion "the Amazon's dense animal biodiversity." Target B includes suggestion "its high variety of animal life within the region".

A user can select (640) a rewrite from the editor pane 630. The selected rewrite can replace the phrase 635 in the text, such as shown in the edited text 645 of FIG. 6D.

Of course, in some implementations, the targeted rewrite tool may be part of a background process or 'always running' type of process such that suggestions are provided to the user without a direct request.

Figure 7A:
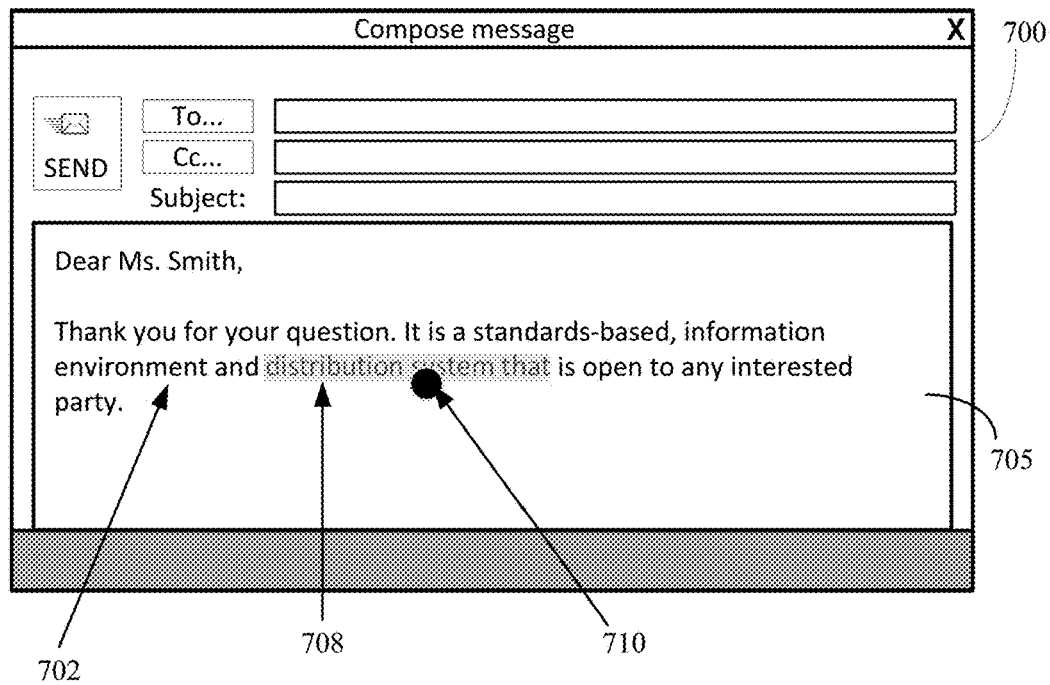
FIGS. 7A-7D illustrate another example scenario for an application with a targeted rewrite tool.

FIGS. 7A-7D illustrate another example scenario for an application with a targeted rewrite tool. In the scenario illustrated in FIGS. 7A-7D, the application with targeted rewrite tool is an email application. Referring to FIG. 7A, a user may be creating an email in a message item interface 700 and entering content 702 in the body 705 of the message item interface 700.

Figure 7B:
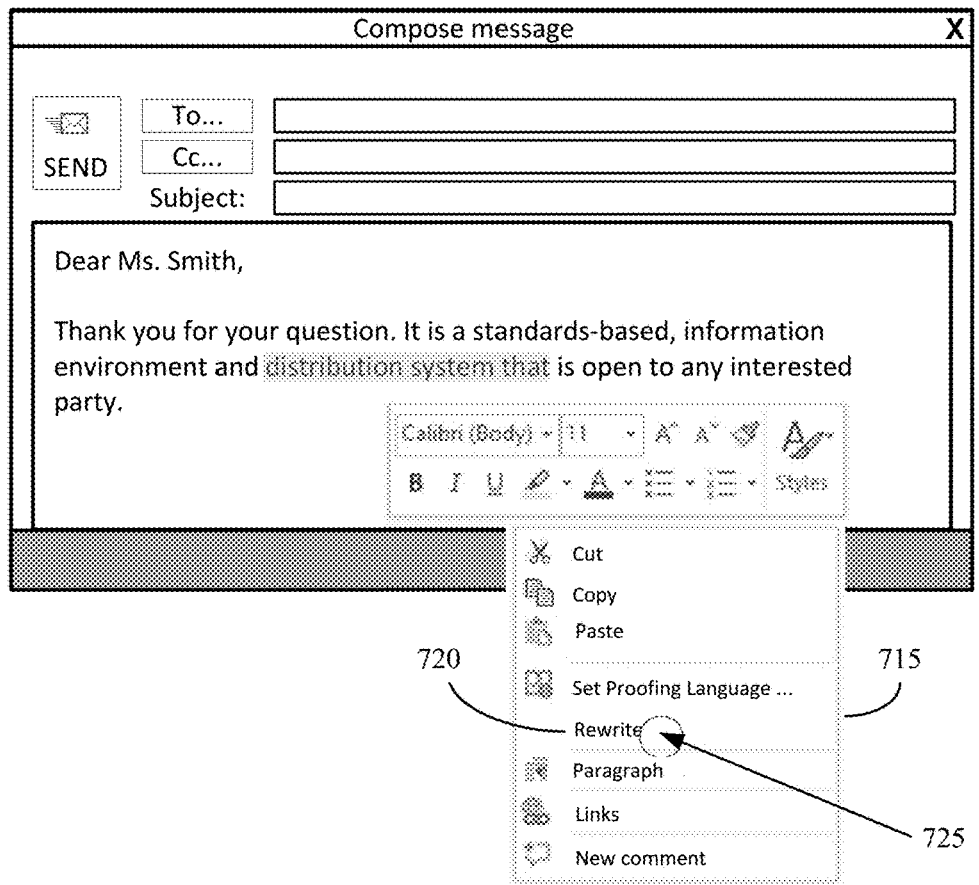
Figure 7C:
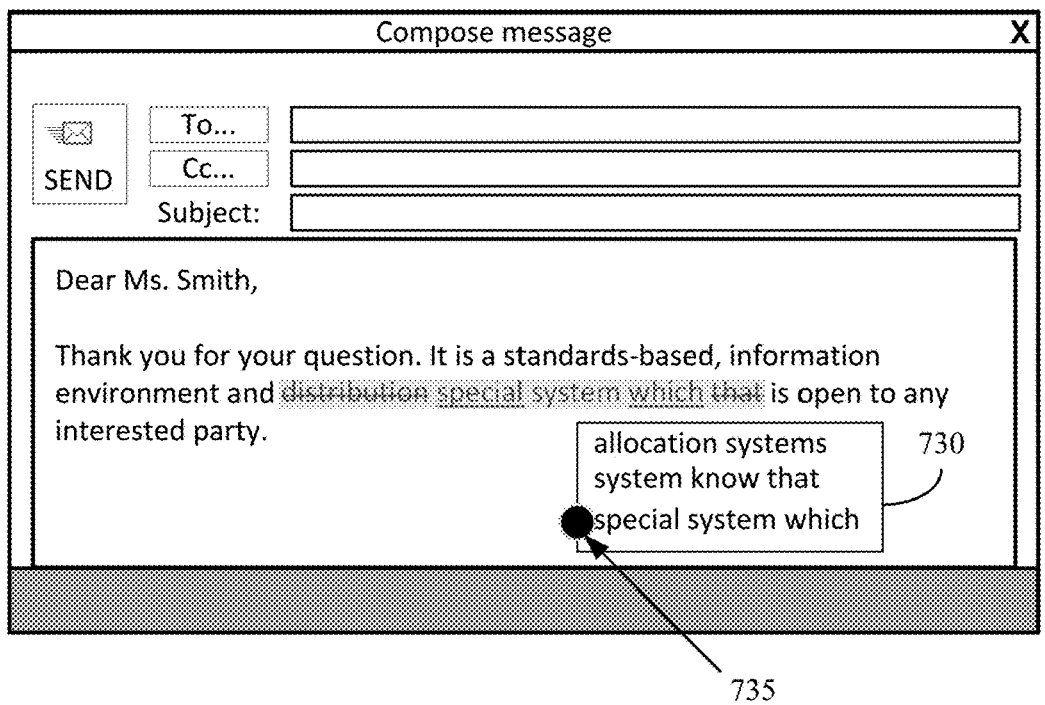
Figure 7D:
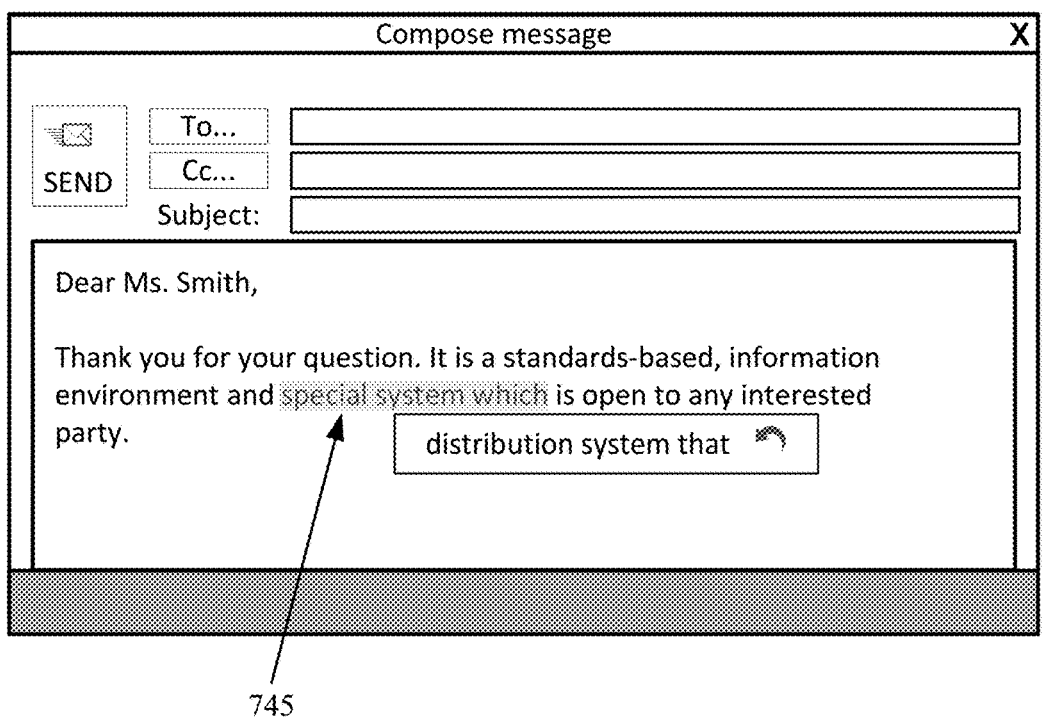

The user may access the targeted rewrite tool through a direct request. In the illustrated example, a right click (710) in the message body 705, for example after selecting a portion of text (e.g., selected phrase 708), can cause a context menu 715 to surface such as shown in FIG. 7B. Referring to FIG. 7B, the context menu 715 may include reviewing tools and provide an icon or menu selection for the rewrite command 720. Selecting (725) the rewrite command 720 can (in addition to causing a set of targeted rewrites to be generated), cause a window 730 to open, such as shown in FIG. 7C. Referring to FIG. 7C, the window 730 can show a set of targeted rewrites. The user may preview each rewrite (and in some cases, see the preview in a track-changes format). Then, when the user selects (735) a rewrite from the window 730, the selected rewrite can replace the phrase 708 in the text, such as shown in the edited text 745 of FIG. 7D.

Figure 8A:
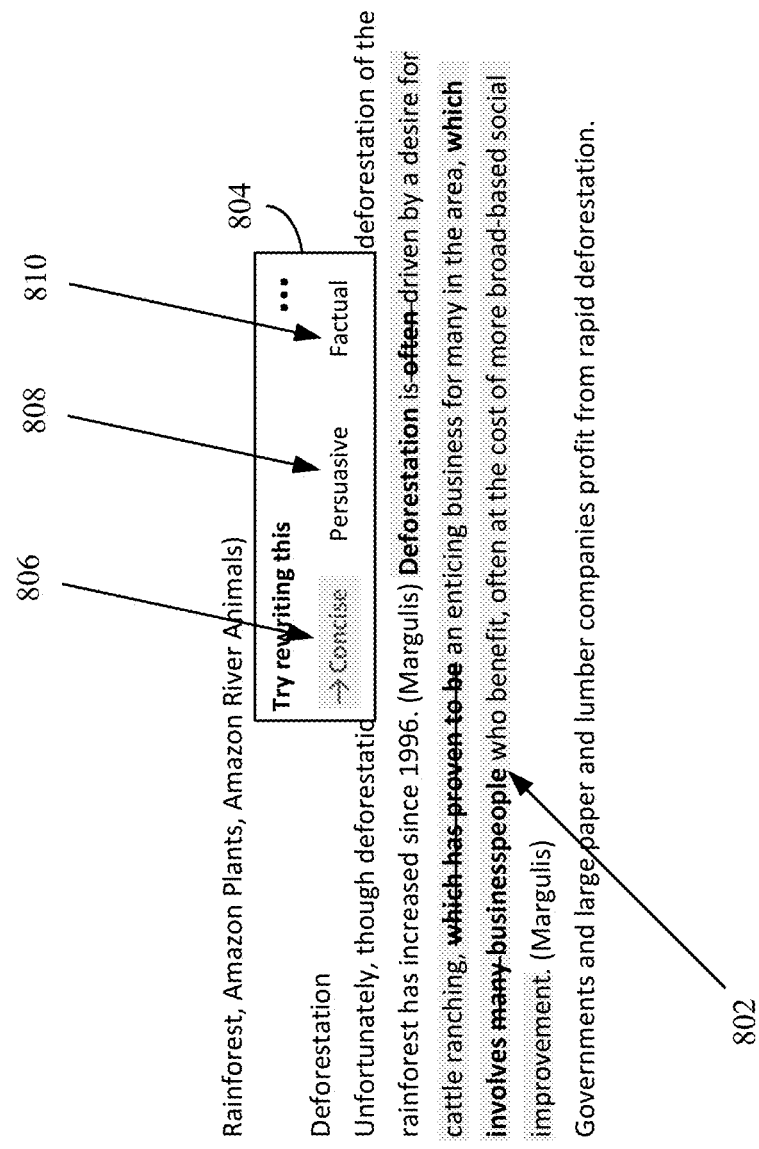

FIGS. 8A-8C illustrate example scenarios of a targeted rewrite of a sentence. Referring to FIG. 8A, in some cases, instead of a phrase, a whole sentence may be rewritten using a targeted rewrite. In the example scenario, a sentence 802 is shown as being selected and a contextual menu 804 is provided in which a user may select a target for rewrite (e.g., concise 806, persuasive 808, and factual 810). FIGS. 8B and 8C illustrate example menu/commands for a sentence rewrite. In the scenario shown in FIG. 8B, the targeted rewrite tool may be used to identify potential sentences for rewrite, for example, during a document check (which may check for spelling and grammar errors). As illustrated in FIG. 8C, in some cases, sentence suggestions may be provided with a preview window showing the sentence in context.

Figure 9A:
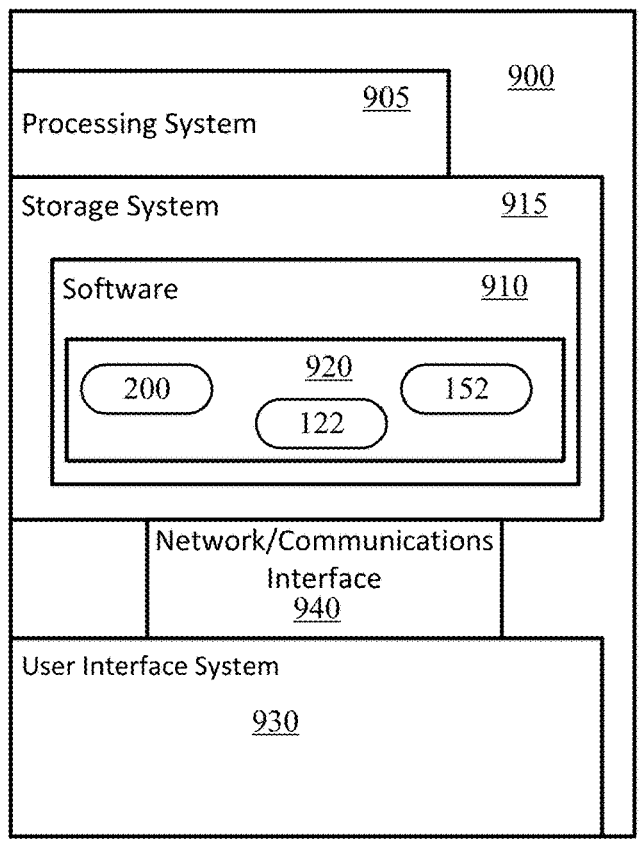
FIGS. 9A and 9B illustrate components of example computing systems that may carry out the described processes.
Figure 9B:
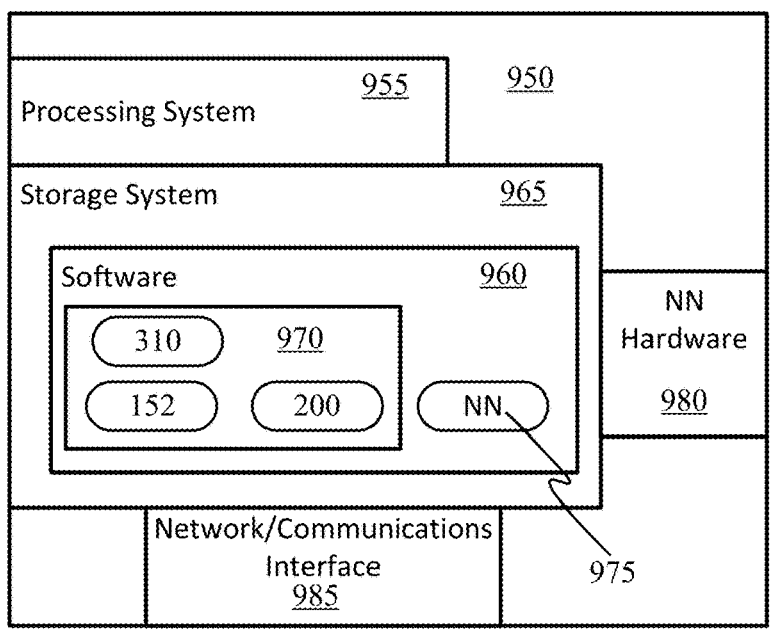

FIGS. 9A and 9B illustrate components of example computing systems that may carry out the described processes.

Referring to FIG. 9A, system 900 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, a smart television, or an electronic whiteboard or large form-factor touchscreen. Accordingly, more or fewer elements described with respect to system 900 may be incorporated to implement a particular computing device. Referring to FIG. 9B, system 950 may be implemented within a single computing device or distributed across multiple computing devices or sub-systems that cooperate in executing program instructions. Accordingly, more or fewer elements described with respect to system 950 may be incorporated to implement a particular system. The system 950 can include one or more blade server devices, standalone server devices, personal computers, routers, hubs, switches, bridges, firewall devices, intrusion detection devices, mainframe computers, network-attached storage devices, and other types of computing devices.

In embodiments where the system 950 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

Systems 900 and 950 can include processing systems 905, 955 of one or more processors to transform or manipulate data according to the instructions of software 910, 960 stored on a storage system 915, 965. Examples of processors of the processing systems 905, 955 include general purpose central processing units (CPUs), graphics processing units (GPUs), field programmable gate arrays (FPGAs), application specific processors, and logic devices, as well as any other type of processing device, combinations, or variations thereof.

The software 910 can include an operating system and application programs 920, including application 122 and/or services 152, as described with respect to FIGS. 1A and 1B (and in some cases aspects of service(s) 310 such as described with respect to FIG. 3). In some cases, application 920 can perform some or all of process 200 as described with respect to FIG. 2.

Software 960 can include an operating system and application programs 970, including services 152 as described with respect to FIG. 1B and services 310 as described with respect to FIG. 3; and application 970 may perform some or all of process 200 as described with respect to FIG. 2. In some cases, software 960 includes instructions 975 supporting a neural network or other implementation of a targeted rewrite engine such as described with respect to FIGS. 3, 4A, 4B, 5A, and 5B. In some cases, system 950 can include or communicate with neural network hardware 980 to instantiate a targeted rewrite engine.

In some cases, models (e.g., models 140, 160, 420) may be stored in storage system 915, 965.

Storage systems 915, 965 may comprise any suitable computer readable storage media. Storage system 915, 965 may include volatile and nonvolatile memories, removable and non-removable media implemented in any method or technology for storage of information, such as computer readable instructions, data structures, program modules, or other data. Examples of storage media of storage system 915, 965 include random access memory, read only memory, magnetic disks, optical disks, CDs, DVDs, flash memory, magnetic cassettes, magnetic tape, magnetic disk storage or other magnetic storage devices, or any other suitable storage media. In no case do storage media consist of transitory, propagating signals.

Storage system 915, 965 may be implemented as a single storage device but may also be implemented across multiple storage devices or sub-systems co-located or distributed relative to each other. Storage system 915, 965 may include additional elements, such as a controller, capable of communicating with processing system 905, 955.

System 900 can further include user interface system 930, which may include input/output (I/O) devices and components that enable communication between a user and the system 900. User interface system 930 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

The user interface system 930 may also include output devices such as display screen(s), speakers, haptic devices for tactile feedback, and other types of output devices. In certain cases, the input and output devices may be combined in a single device, such as a touchscreen display which both depicts images and receives touch gesture input from the user.

A natural user interface (NUI) may be included as part of the user interface system 930 for a user (e.g., user 100 of FIGS. 1A and 1B) to input selections, commands, and other requests, as well as to input content. Examples of NUI methods include those relying on speech recognition, touch and stylus recognition, gesture recognition both on screen and adjacent to the screen, air gestures, head and eye tracking, voice and speech, vision, touch, hover, gestures, and machine intelligence. Accordingly, the systems described herein may include touch sensitive displays, voice and speech recognition, intention and goal understanding, motion gesture detection using depth cameras (such as stereoscopic or time-of-flight camera systems, infrared camera systems, red-green-blue (RGB) camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods).

Visual output may be depicted on a display in myriad ways, presenting graphical user interface elements, text, images, video, notifications, virtual buttons, virtual keyboards, or any other type of information capable of being depicted in visual form.

The user interface system 930 may also include user interface software and associated software (e.g., for graphics chips and input devices) executed by the OS in support of the various user input and output devices. The associated software assists the OS in communicating user interface hardware events to application programs using defined mechanisms. The user interface system 930 including user interface software may support a graphical user interface, a natural user interface, or any other type of user interface.

Network interface 940, 985 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Certain Embodiments may be implemented as a computer process, a computing system, or as an article of manufacture, such as a computer program product or computer-readable storage medium. Certain methods and processes described herein can be embodied as software, code and/or data, which may be stored on one or more storage media. Certain embodiments of the invention contemplate the use of a machine in the form of a computer system within which a set of instructions, when executed by hardware of the computer system (e.g., a processor or processing system), can cause the system to perform any one or more of the methodologies discussed above. Certain computer program products may be one or more computer-readable storage media readable by a computer system (and executable by a processing system) and encoding a computer program of instructions for executing a computer process. It should be understood that as used herein, in no case do the terms "storage media", "computer-readable storage media" or "computer-readable storage medium" consist of transitory carrier waves or propagating signals.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method for providing targeted rewrites, comprising:
receiving a selection of text in a file of a first application file format and target information comprising a second application file format, wherein the selection of text in the file of the first application file format has a first style of an informal style for a profession and a particular target style is of a formal style for a profession;
identifying one or more target styles for the second application file format;
converting the selection of text from the first application file, format to a set of target rewrites suitable for the second application file format by generating the set of target rewrites of the selection of text, the set of target rewrites comprising:
  at least one phrase or sentence having semantic similarity to a phrase or sentence of the selection of text; and
  a style that corresponds to the particular target style of the one or more target styles for the second application file format, wherein a target style is a representative style for a genre, profession, or environment;
providing one or more of the target rewrites of the set of target rewrites suitable for the second application file format; and
replacing the selection of text in the file with a target rewrite of the one or more of the target rewrites suitable for the second application file format,
wherein generating the set of target rewrites comprises analyzing the text using a targeted rewrite engine.

2. The method of claim 1, wherein the target information comprises an explicit indicator of the second application file format.

3. The method of claim 1, wherein the target information comprises a natural language statement from a user indicative of the second application file format.

4. The method of claim 1, wherein the target information further comprises context information, wherein the context information comprises an application name of an application for which the text is being created or consumed, a user name associated with the selection of text, a file name of the file, other content in the file, or a combination thereof.

5. The method of claim 1, wherein the targeted rewrite engine comprises a neural network.

6. The method of claim 1, wherein the selection of text comprises a number of characters before text expressly selected by a user, a number of characters after text expressly selected by the user, a number of characters both before and after text expressly selected by the user, an entire text of the file, or a portion of text expressly selected by the user.

7. The method of claim 1, wherein the file is a document, a message item, or a chat channel item.

8. A system for providing targeted rewrites, comprising:
a processing system;
a storage system; and
instructions stored on the storage system that direct the system for providing targeted rewrites to at least:
  receive, from a source a selection of text in a file of a first application file format;
  receive target information comprising a second application file format;
  determine a target from the target information comprising the second application file format;
  identify one or more target styles for the determined target associated with the second application file format, wherein a target style is a representative style for a genre, profession, or environment;
  convert the selection of text from the first application file format to a set of target rewrites suitable for the second application file format by generating the set of target rewrites of the selection of text, the set of target rewrites comprising:
    at least one phrase or sentence having semantic similarity to a phrase or sentence of the selection of text; and
    a style that corresponds to a particular target style of the one or more target styles for the second application file format; and
  communicate, to the source, one or more of the target rewrites of the set of target rewrites suitable for the second application file format,
  wherein the instructions to generate the set of target rewrites direct the system to at least analyze the text using a targeted rewrite engine.

9. The system of claim 8, wherein the targeted rewrite engine comprises a neural network.

10. The system of claim 8, wherein the target indicates which model is used by the targeted rewrite engine.

11. One or more computer readable storage media having instructions stored thereon that when executed by a computing system, direct the computing system to:
receive a selection of text in a file of a first application file format and target information comprising a second application file format;
identify one or more target styles for the second application file format;
convert the selection of text from the first application file format to a set of target rewrites suitable for the second application file format by generating the set of target rewrites of the selection of text, the set of target rewrites comprising:
  at least one phrase or sentence having semantic similarity to a phrase or, sentence of the selection of text; and
  a style that corresponds to a particular target style of the one or more target styles for the second application file format, wherein a target style is a representative style for a genre, profession, or environment;
provide one or more of the target rewrites of the set of target rewrites suitable for the second application file format; and
replace the selection of text in the file with a target rewrite of the one or more of the target rewrite suitable for the second application file format,
wherein the instructions to generate the set of target rewrites direct the computing system to at least analyze, the text using a targeted rewrite engine.

12. The one or more media of claim 11, wherein the target information comprises an explicit indicator of the second application file format.

13. The one or more media of claim 11, wherein the target information comprises a natural language statement from a user indicative of the second application file format.

14. The one or more media of claim 11, wherein the target information further comprises context information, wherein the context information comprises an application name of an application for which the text is being created or consumed, a user name associated with the selection of text, a file name of the file, other content in the file, or a combination thereof.

15. The one or more media of claim 11, wherein the file is a document, a message item, or a chat channel item.

16. The one or more media of claim 11, wherein the selection of text in the file of the first application file format has a first style of an informal style for a profession and the particular target style is of a formal style for a profession.

* * * * *